UNITED STATES PATENT OFFICE.

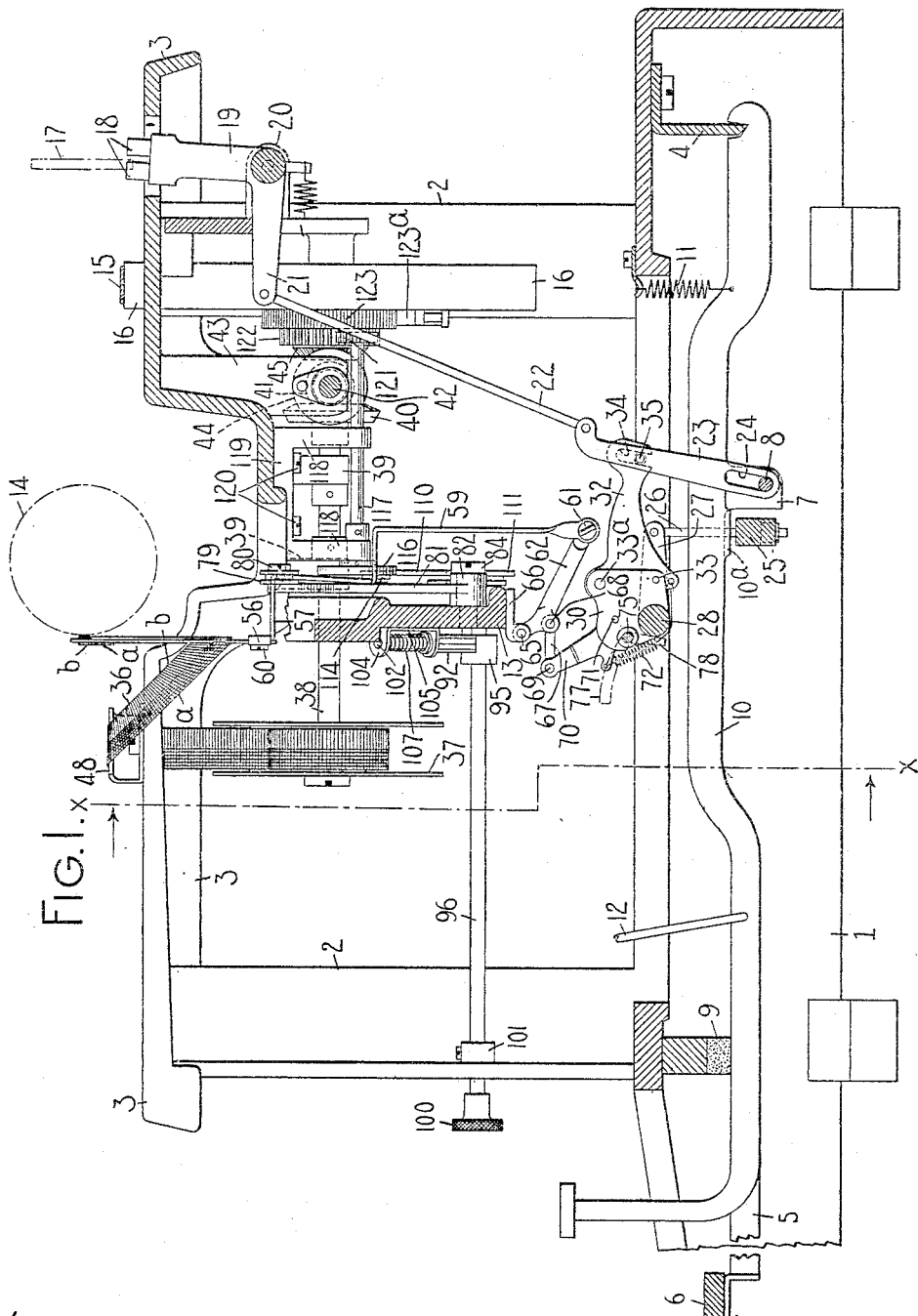

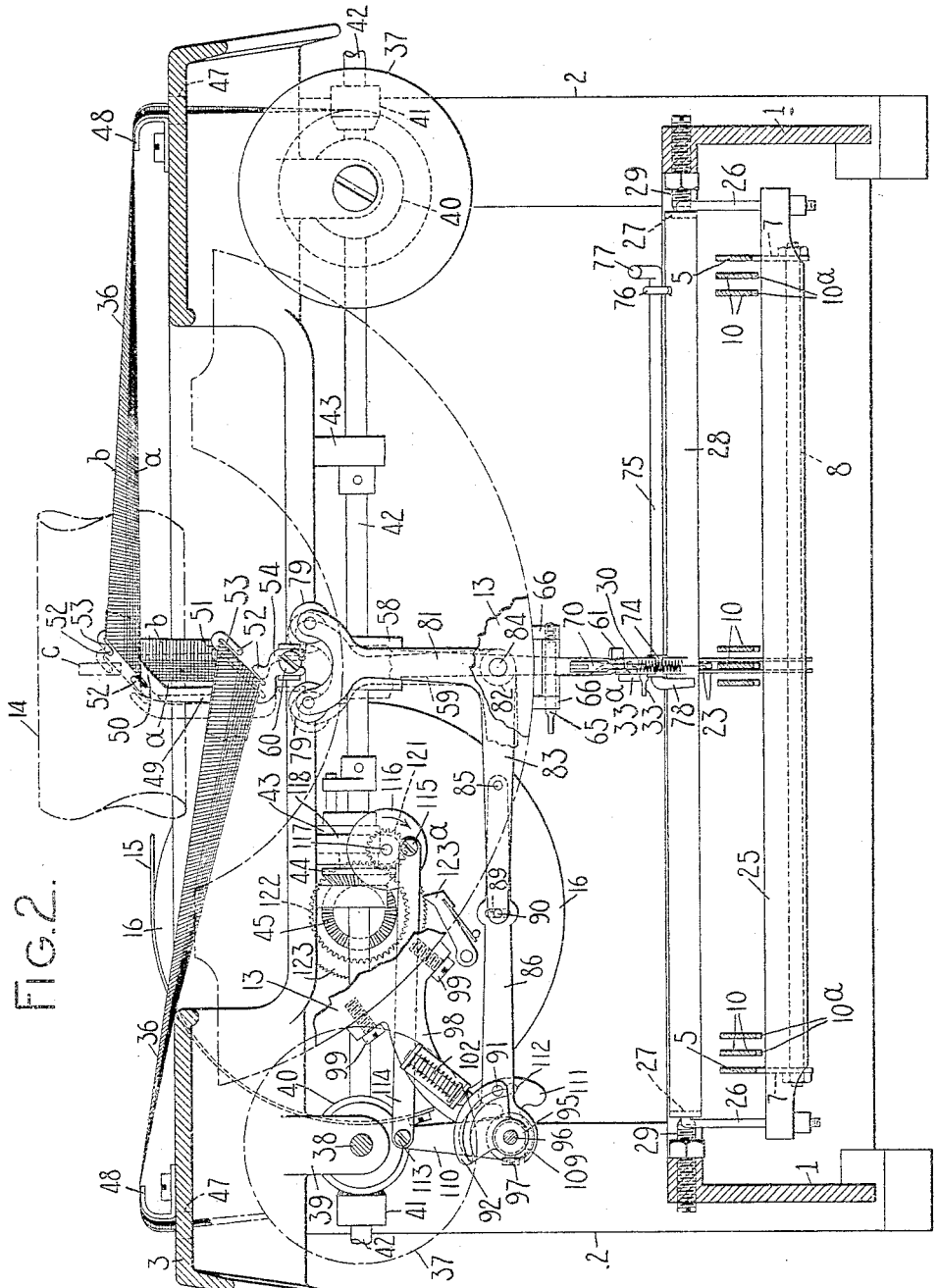

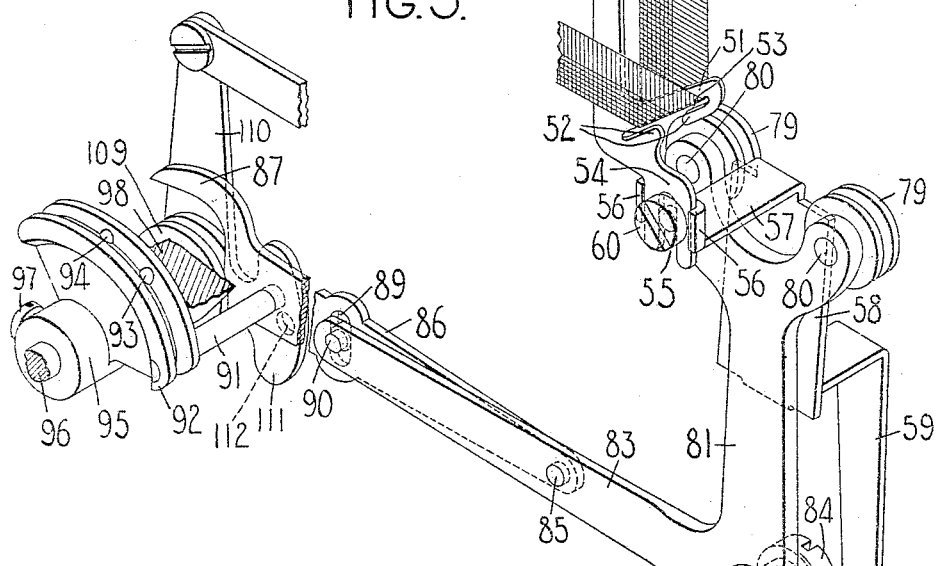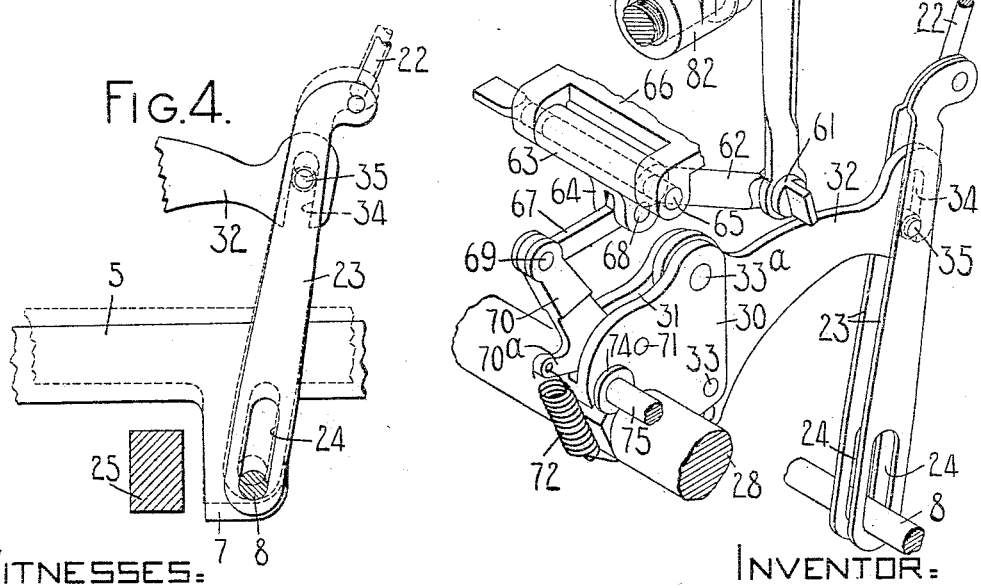

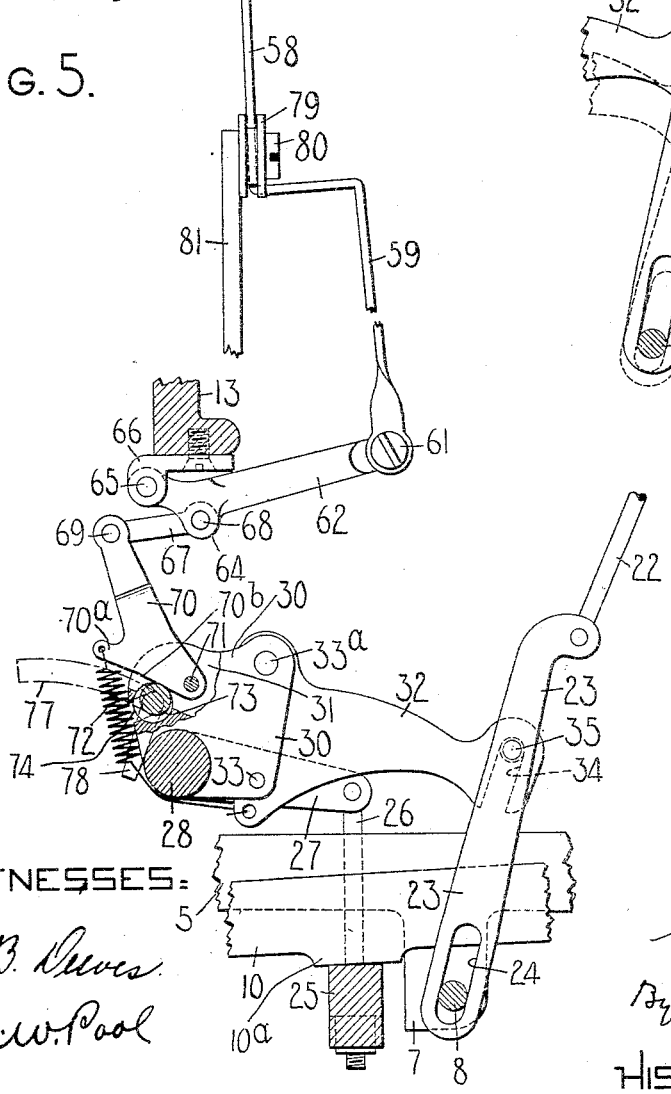

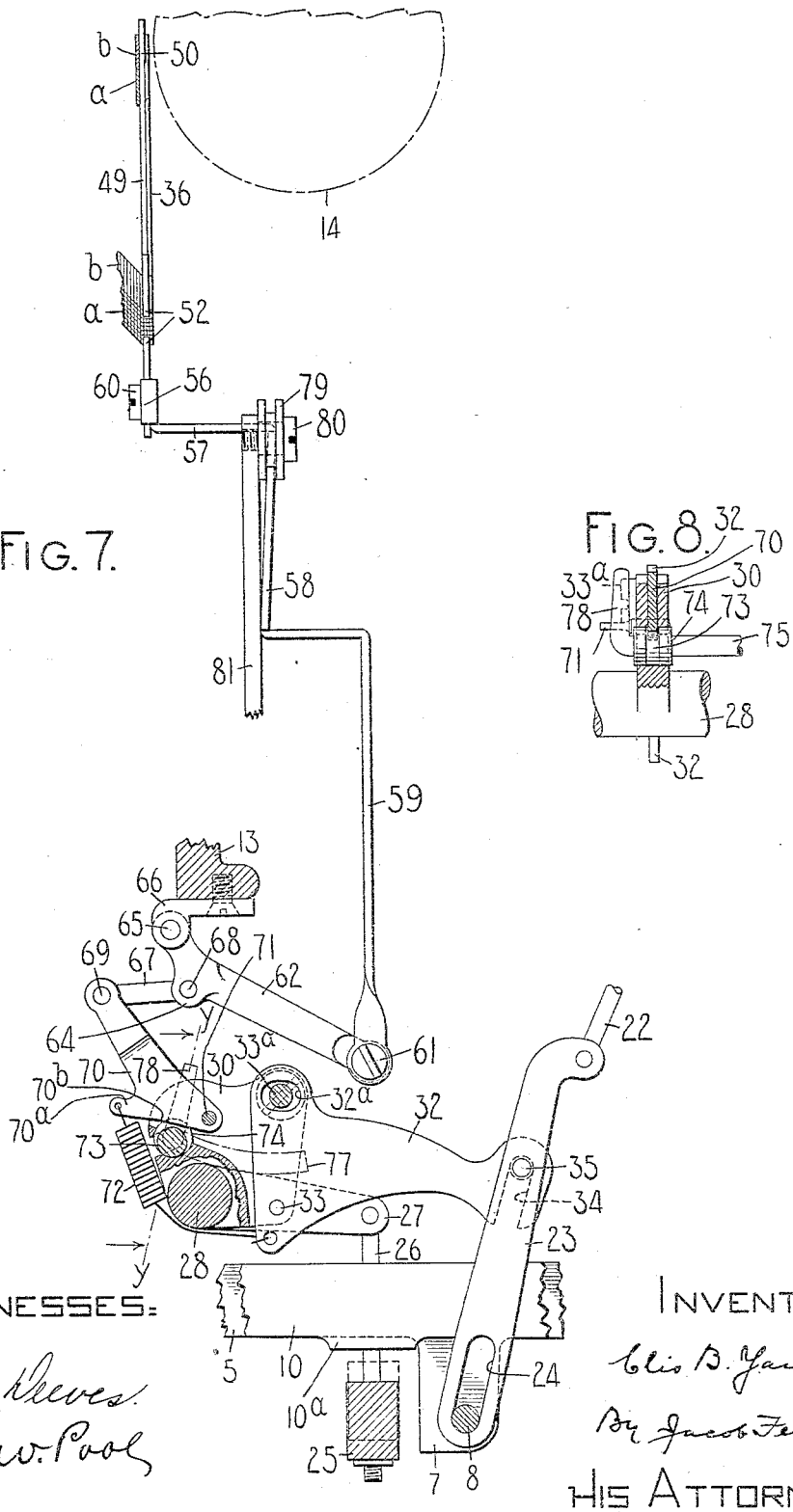

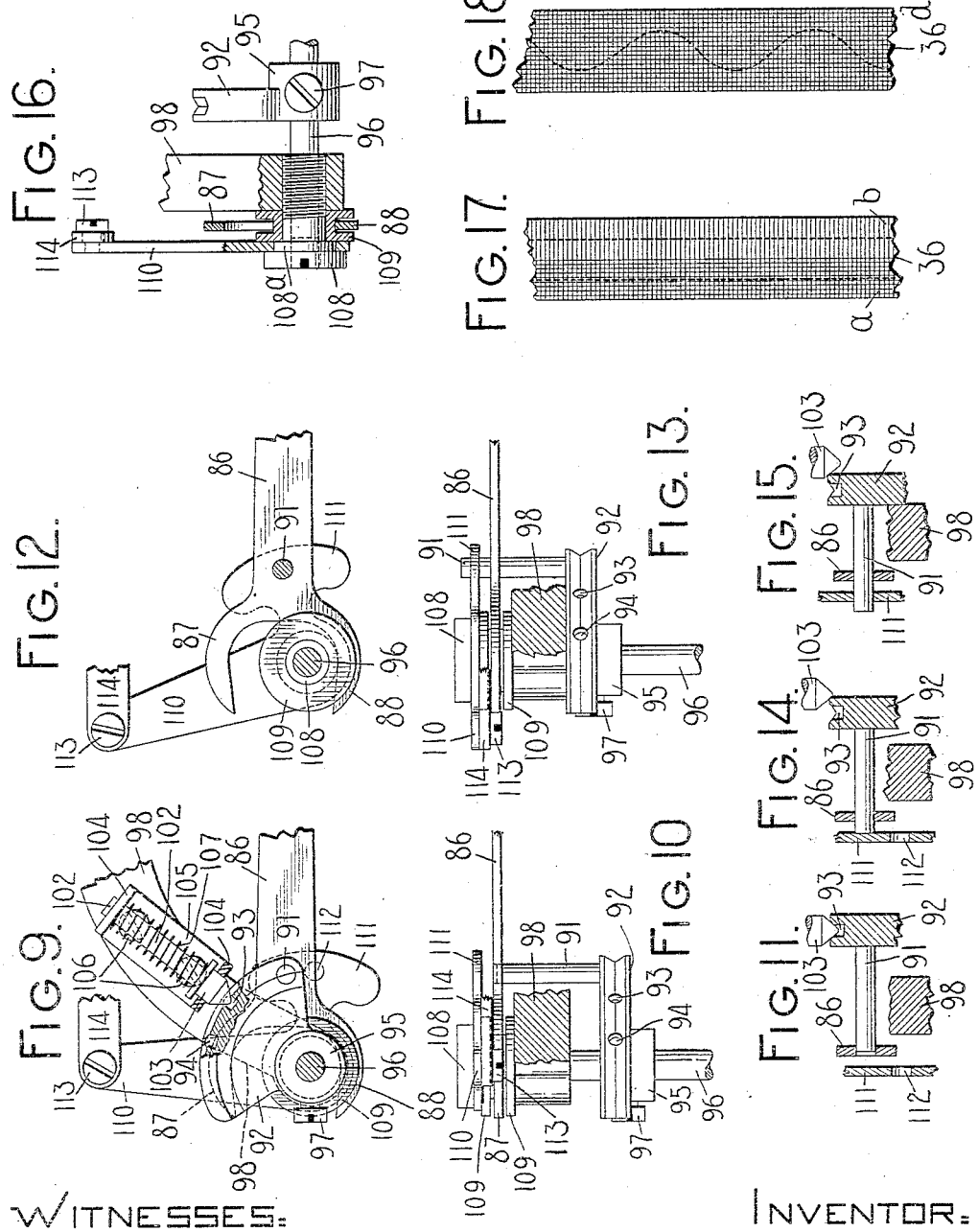

CLIO B. YAW, OF ARLINGTON, NEW JERSEY, ASSIGNOR TO WYCKOFF, SEAMANS & BENEDICT, OF ILION, NEW YORK, A CORPORATION OF NEW YORK.

TYPE-WRITING MACHINE.

958,573.  Specification of Letters Patent.  Patented May 17, 1910.

Application filed December 27, 1907. Serial No. 408,238.

*To all whom it may concern:*

Be it known that I, CLIO B. YAW, citizen of the United States, and resident of Arlington, in the county of Hudson and State of New Jersey, have invented certain new and useful Improvements in Type-Writing Machines, of which the following is a specification.

My invention relates especially to ribbon mechanism for typewriting machines; and its object is to provide improved devices of the class specified.

To the above and other ends the invention consists in the features of construction, combinations of devices and arrangements of parts hereinafter described and particularly pointed out in the claims.

My invention is shown in the present case as applied to a machine of the front-strike variety but it is to be understood that various features of the invention may be applied to other styles of writing machines.

In the accompanying drawings, Figure 1 is a vertical front to rear sectional view of a machine embodying my invention, parts of the machine being omitted and parts broken away. Fig. 2 is a vertical sectional view taken on the plane represented by the line $x$—$x$ in Fig. 1 and looking in the direction of the arrows at said line, parts of the machine being omitted and parts broken away. Fig. 3 is a perspective view showing parts of the ribbon mechanism, said figure being drawn to a larger scale than Figs. 1 and 2. Fig. 4 is a fragmentary detail view in side elevation and partly in section, said figure being drawn to the same scale as Fig. 3. Fig. 5 is a skeleton view showing parts of the ribbon mechanism, the vibratory ribbon carrier being shown in one of its operative positions. Fig. 6 is a fragmentary detail view showing some of the parts of Fig. 5 in different relations from those in which they appear in said Fig. 5. Fig. 7 is a view corresponding to Fig. 5 but showing the parts in different relations from those in which they appear in said Fig. 5. Fig. 8 is a sectional view taken on a plane represented by the line $y$—$y$ in Fig. 7 and looking in the direction of the arrows at said line. Fig. 9 is a detail fragmentary front view partly in section showing parts of the ribbon mechanism. Fig. 10 is a plan view partly in section of various parts shown in Fig. 9. Fig. 11 is a fragmentary sectional view showing various parts in the same relations as they appear in Figs. 9 and 10. Fig. 12 is a view corresponding to Fig. 9 but showing some of the parts in different relations and omitting other parts shown in Fig. 9. Fig. 13 is a view corresponding to Fig. 10 but showing some of the parts in different relations from those in which they appear in said Fig. 10. Figs. 14 and 15 are sectional views corresponding to Fig. 11 but showing parts in different relations from those in which they appear in Fig. 11. Fig. 16 is a fragmentary side elevation partly in section showing details of the ribbon carrier adjusting and setting mechanism. Figs. 17 and 18 are fragmentary views showing portions of ribbons which may be employed with my invention, the paths which the types may follow on said ribbons being indicated by dotted lines.

Referring more especially to Figs. 1 and 2, the main frame of the machine is shown as comprising a base 1, corner posts 2, and a top plate 3. A fulcrum plate 4 is secured at the rear of the base, and fulcrumed on said plate are spacing levers 5 connected at their front ends by a space bar 6, each spacing lever 5 being provided with a depending tab or ear 7, said tabs being connected by a cross rod 8. The spacing levers are maintained normally against a pad or rest 9 by springs (not shown). Key levers 10 are fulcrumed on the fulcrum plate 4, each key lever being provided with a restoring spring 11 and being connected by a link 12 and other actuating devices (not shown) with a type bar (not shown), the set of type bars being supported on a segment or support 13, said segment in the present instance being stationary and suitably secured to the frame of the machine. The type bars when actuated are adapted to coöperate with the front face of a platen 14, diagrammatically illustrated, which may be of the shiftable class. Said platen is mounted in a suitable carriage (not shown), said carriage being connected by a band or strap 15 with a spring drum 16 which constantly urges the platen and carriage leftward across the top plate. The letter space movements of the platen and carriage are controlled by suitable carriage feeding or escapement devices comprising an escapement wheel 17, diagrammatically illustrated.

Coöperative with said escapement wheel are escapement dogs 18 carried at the top of a dog rocker 19 pivotally mounted on a stationary bracket 20 and having a forwardly projecting arm 21 connected by a link 22 with a member comprising parallel arms 23 (see especially Fig. 3), said arms being formed with elongated slots 24 through which the rod 8 passes, said rod being normally at the bottom of said slots. A universal bar 25 underlies the key levers 10 which are provided with projections 10$^a$ coöperative with said universal bar. The spacing levers 5, however, are not provided with such projections as it is not desired that the universal bar shall be operated by said spacing levers. Said universal bar is supported at its ends on arms or links 26, said links being pivotally suspended from crank arms 27 extending horizontally rearward from the ends of a rock shaft 28, said rock shaft being pivoted on screw pivots 29 secured in the base 1. Fixed centrally to the rock shaft 28 is an upwardly and rearwardly extending plate-like member 30, said member, as clearly shown in Fig. 3, being formed with a kerf or slot-way 31 which receives an extension 32, said extension being pivotally connected at 33 with said member 30 and being maintained in an adjustable fixed relation with said member by a headed screw 33$^a$ which passes from one jaw of the plate 30 to the other through a slot or enlarged opening 32$^a$ on the extension 32. This construction is clearly shown in Figs. 3 and 7. It will be understood that on loosening the screw 33$^a$, the extension 32 may be swung on its pivot 33 to vary its relation with the plate 30 and that after this relationship has been satisfactorily arrived at, the screw 33$^a$ may be tightened to clamp the extension 32 between the jaws of the plate 30, the result being that in the operation of the parts the plate 30 and the extension 32 are rigidly connected and act as one member. The extension 32 projects rearward from the rock shaft and its rear end portion passes between the arms 23 and is provided with a slot 34 which engages a cross pin 35 connecting the arms 23 near their upper end portions. Normally the upper or closed end of the slot 34 is separated from the pin 35 as shown in Figs. 1, 3 and 6.

It will be understood that when one of the key levers 10 is operated to actuate the associate type bar, said actuated key lever will depress the universal bar 25 and rock the rock shaft 28, causing the plate 30 and extension 32 to swing downward. When the extension 32 is moved downward far enough to bring the closed end of the slot 34 into contact with the cross pin 35, the arm 23 and link 22 will start to move, causing the dog carrier or rocker 19 to swing forward and the escapement devices to coöperate in a known manner, the result being that a complete vibration of the dog rocker affords a letter space feed movement of the carriage.

The relation between the extension 32 and the arm 23 at the limit of downward movement of the parts is illustrated in Fig. 5 and in dotted lines in Fig. 6. By comparing the full and dotted line positions in the latter figure the change in relation between the normal and operated positions of the parts will be clearly understood. During the downward and upward movement of the link 22 and arms 23 the slots 25 in said arms will be moved relatively to the cross rod 8 but without affecting the latter or the space bar 6 with which it is connected. The movement of the rock shaft 28 and member 30 just referred to serves also to actuate the ribbon vibrating mechanism presently to be described. When the space bar 6 is depressed the levers 5 will not be moved down far enough to engage with the universal bar 25 so that the rock shaft 28 and ribbon vibrating mechanism will not be affected. The escapement devices will be caused to operate, however, by the rod 8 which engages the arms 23 and pulls said arms and the link 22 downward.

A ribbon 36 is secured to and wound upon ribbon spools 37, said ribbon spools being vertically disposed beneath the top plate, one at each side of the machine and forward of the platen as shown in Figs. 1 and 2. Each ribbon spool is secured to the forward end of a horizontal shaft 38 journaled in lugs 39 depending from the top plate. Said shaft is provided at its rear end with a beveled pinion 40 which is adapted to coöperate with a beveled driving pinion 41 secured to a driving or power shaft 42 journaled in lugs 43 depending from the top plate. The driving shaft is connected with and adapted to receive motion from the spring drum 16 by a train of devices comprising beveled pinions 44 and 45 which are constantly in mesh with each other. The pinion 45 is suitably connected to the spring drum when the latter turns to draw the carriage in printing direction. The pinion 44 is slidably connected with the driving shaft 42 so that the shaft may be moved endwise to connect one or the other of the driving pinions 41 with its associate pinion 40, thereby causing the associate ribbon spool to be turned to wind the ribbon thereon. The ribbon 36 is led upward from each ribbon spool through an opening 47 in the top plate and over a guide plate 48 suitably secured thereto. Centrally of the machine between the ribbon spools the ribbon is threaded through a vibratory ribbon carrier, vibrator or guide which, in the present case, includes a head comprising a neck 49 joining upper and lower turning bars or devices 50 and 51 which are diagonally arranged and provided with guard fingers 52, said guard fingers forming with the edges of the turn bars, slot ways 53. The ribbon passes or is led horizontally inward toward the middle of the machine from the right hand guide 48 and passes over the front of the upper turning bar 50 through the slot ways 53 after which said ribbon is turned and passes vertically downward behind said upper turning bar over the back of the lower turning bar 51, through the lower slot ways 53, after which the ribbon again takes a turn and passes over the front of the turning bar 51 and the lower portion of the neck 49 and thence upward and laterally outward to the left-hand guide 48. It will be observed that the printing portion of the ribbon, by which is meant the vertical portion of the ribbon which stretches or passes from one turning bar or device to the other, is normally below the printing point and printing line on the platen and is substantially at right angles to said printing line and to the general direction of the ribbon as it passes from one ribbon spool to the other, and also to a line connecting the ribbon spool. It will further be noted that the head of the vibrator is open at one side and that normally it is below the printing point so that if a type bar should be actuated without any corresponding movement of the vibrator, the type on said actuated type bar would contact with the front face of the platen above the vibrator. This will be clear from a consideration of Fig. 2 in which a type block is shown in printing position, said type block being represented by dotted lines and designated by the reference character $c$.

The head of the vibrator is provided with a stem 54 which is formed with a slot 55. The stem fits between ears 56 projecting forward from the upper end portion of a vibrator arm, which arm comprises a horizontal portion 57 and a vertical plate-like portion 58 extending downward at right angles from the rear of said horizontal portion and provided with an angular tail or stem 59. The construction just described is clearly shown in Fig. 3. The vibrator head and the vibrator arm are adjustably secured together by a headed screw 60 which passes through the slot 55 and engages in the upper end portion of the vibrator arm. The vibrator head and vibrator arm consequently act as a single member although they may be relatively adjusted. The lower end of the vibrator arm is pivotally connected at 61 to an operating lever which comprises a rearwardly extending arm 62, a pivot portion 63 and a lug 64. The pivot portion is bored out to receive a screw pivot 65 which is secured in the ears of a bracket 66, said bracket being detachably fixed to the lower middle portion of the type bar support 13. The lug 64 is slotted to receive an actuating link 67, said link and said lug being pivotally connected at 68, the link thence extending forward and being pivotally connected at 69 with the bifurcated upper end portion of an arm 70, said arm being arranged in the slot way 31 in the plate 30 and being pivotally connected with said plate at 71. As is clearly shown in Figs. 5 and 7, a coiled spring 72 is connected at one end to a lug 70$^a$ on the arm 70 and at its other end to the lower end portion of the extension 32 below the rock shaft 28. The spring passes over the front and under sides of the member 30 and rock shaft 28 and tends constantly to draw the arm 70 downward and forward on its pivot 71 and to press the lower diagonal edge 70$^b$ of the arm against the face 73 of a rotary member 74 which is seated in a bearing opening in the plate 30. As will be seen from a consideration of Figs. 5, 7 and 8, the face 73 of the member 74 is eccentrically arranged so that when said member is turned in its bearing, the arm 70 will be raised and lowered by the combined action of said eccentric face and the spring 72 and the relation between said arm 70 and the other parts supported by the rock shaft 28 will be altered. This construction is for the purpose of enabling the vibrator to be maintained inoperative when the printing keys are actuated for mimeographing purposes or the like and will subsequently be explained more fully. The member 74 is fast on a shaft 75 which, as best appears in Fig. 2, extends lengthwise of the rock shaft 28 and is supported near its right-hand end in a screw eye 76 or other suitable bearing secured to said rock shaft. Outside of said bearing the end of the shaft 75 is bent angularly to form a handle or finger piece 77. The inner end of the shaft at the left of the member 74 is bent angularly at substantially right angles to the finger piece 77 and provides a stopping portion 78 which is adapted to contact with the rock shaft 28 to limit the forward turning of the shaft 75. The shaft as it is turned of course effects a rotary movement of the member 74 and the eccentric 73 and when the stop 78 is in contact with the rock shaft 78 as shown in Figs. 1 and 5, the eccentric will be at its highest point and will maintain the arm 70 raised, the spring 72 being stretched or under tension at this time. It will be understood that when the arm 70 is in this relation it will be held by the spring 72 relatively fixed with respect to the rock shaft 28 so that when a printing key is operated to depress the universal bar the arm 70 will move rearward about the axis of the rock shaft 28, pushing the link 67 rearward and swinging the lever 62 upward, thereby raising the vibrator from the normal position below the printing point, causing the printing portion of the ribbon to be brought opposite the printing point and interposed between the platen and the operated type bar. The position of the vibrator and its actuating devices at this time is shown in Fig. 5. When the actuated key is released the parts will be restored to normal position under the influence of gravity and the usual or suitable restoring springs. During this up and down movement of the vibrator it is suitably guided in a way now to be described.

The guiding devices for the vibrator are clearly illustrated in Figs. 1, 2 and 3. The side edges of the plate-like portion 58 of the vibrator arm coöperate with grooved rollers 79 pivoted at 80 on the forked upper end of a vertically disposed arm 81 of a bell crank lever, which lever further comprises a hub portion 82 and a horizontally disposed leftwardly extending arm 83. This bell crank lever forms a guide for the ribbon carrier or vibrator. The hub portion 82 of the vibrator guide is perforated to receive a headed and shouldered screw 84 which screws into the type bar support 13 at the rear thereof, said screw serving as a pivot for the vibrator guide. The arm 83 is pivotally connected at 85 with an arm 86 which is bifurcated at its left end, forming two forks or fingers 87 and 88 (Fig. 12). The arm 86 is formed with a vertically disposed slot 89 through which passes a screw 90, the latter screwing into the left end portion of the arm 83 and serving to maintain said arm and the arm 86 in a fixed relation. The screw and slot connection between the two arms enables them to be adjusted relatively one to the other and afterward to be secured together so as to operate as a single member. The vibrator guide is connected by a pin 91 to a segment 92, the pin being fixed to the segment and being slidable back and forth in an opening in the arm 86. The segment 92 is clearly shown in Figs. 1, 3 and 9 to 11 inclusive and the periphery of the segment is formed with a V-shaped groove and is provided with two holes or depressions 93 and 94 which coöperate with an adjusting device presently to be described. The segment is provided with a hub 95 which is perforated to receive a combined shaft and slide rod 96, the segment and rod being maintained in a fixed relation by a set screw 97. The rod or shaft 96 is supported near its rear end in a bracket arm 98 which is secured to the curved under side of the support 13 by headed screws 99, the bracket arm curving downward and leftward from said support as clearly shown in Fig. 2. The rod or shaft 96 is horizontally disposed and extends forward through a bearing opening in the front flange of the left-hand front corner post 2 and is provided at its outer or front end with a finger button 100. Back of the corner post flange a collar 101 is suitably secured to the rod or shaft 96 to limit the forward longitudinal movements thereof. A pin 102, best shown in Figs. 1, 2 and 9, having a conical head 103 is slidably supported in the ears 104 of a U-shaped bracket 105 secured by screws 106 to the front face of the bracket arm 98. A wire spring 107 is coiled around the pin 102 between its supports and coöperates with the head 103 to constantly press said pin downward. The head thereof is adapted to coöperate with the grooved periphery of the segment 92 and to engage with one or another of the holes or depressions 93 and 94, as shown in Figs. 9 and 11. Fig. 2 corresponds with these last named figures and it will be seen by a comparison of Figs. 2, 9 and 11 that when the pin 102 is engaged with the hole 93 in the segment the left-hand half of the printing portion of the ribbon will be vertically below the printing point on the platen. It will be seen further that the rod or shaft 96 will be held from movement by the engagement of the pin 102 with the hole 93 in the segment and that said segment, through the pin 91, will hold the vibrator guide fixed in the position shown in Fig. 2, with the result that when the printing keys are actuated and the vibrator is moved upward from normal position to the position shown in Fig. 5, then the left-hand half of the printing portion of the ribbon will be presented to the action of the types.

In the main figures and in Fig. 17 the ribbon 36 is shown divided longitudinally into two fields $a$ and $b$ of different characteristics. The fields may be differently colored, or impregnated with different kinds of ink or may differ in any other respect. Usually the difference is one of color and for purposes of description it may be assumed that the field $a$ may be black in color and the field $b$ red. When the vibrator guide is positioned as has just been described the vibrator will be vibrated up and down in a straight path said vibrator being controlled by the coöperation of the grooved guide rollers 79 with the plate-like parts 58; and the type impressions will consequently follow a straight path longitudinally of the field $a$, this path being represented by the dotted line in Fig. 17.

The devices thus far described afford means for manually shifting the normal position of the vibrator and setting it so that when it is thereafter actuated by the printing keys the field $b$ or the right-hand half of the printing portion of the ribbon will be presented to the types. This shifting of the normal position of the vibrator is accomplished by resetting the vibrator guide in the following manner. The finger button 100 is grasped and turned clockwise, causing rotary movement in the same direction of the rod or shaft 96 and segment 92, forcing the head 103 of the pin 102 out of the hole 93 and causing the grooved periphery of the segment between the holes 93 and 94 to slide over the head 103 until said head engages with the hole 94. This turning movement of the segment 92 operates through the pin 91 on the arms 86 and 83, swinging them downward about the pivot 84 and swinging the arm 81 of the vibrator guide toward the left as viewed from the front of the machine. When the head 93 engages with the hole 94, thereby arresting the parts, the upper arm 81 of the vibrator guide will have been swung leftward to the dotted line position in Fig. 2. It will be understood that the vibrator guide not only controls the up and down or vibratory movements of the vibrator but that by reason of the engagement of the guide rollers 79 with the plate 58 the vibrator will also be compelled to participate in the swinging or resetting movements of said vibrator guide, during which movement said guide turns on the pivot 84. The result is that the movement of the vibrator guide from the full line position to the dotted line position in Fig. 2 effects a corresponding movement of the vibrator and moves the latter lengthwise of the platen toward the left, there being sufficient looseness at the pivotal point 61 to permit of this movement of the vibrator. The right-hand half of the printing portion of the ribbon or, in other words, the field $b$, will, by this movement, be brought directly below the printing point on the platen so that when thereafter the printing instrumentalities are operated, the vibrator will move upward to interpose the ribbon $b$ between the platen and types. The result will be that while the vibrator guide is maintained set in the dotted line position the field $b$ only will be made use of and the types will follow a straight path lengthwise of the field $b$ and parallel with the path previously followed lengthwise of the field $a$ and the path lengthwise of the field $b$ is represented by a dotted line in Fig. 17. When it is again desired to make use exclusively of the field $a$ the vibrator guide and vibrator may be shifted back to the first position by turning the finger button 100 in reverse direction.

From what has been said it will be seen that I provide means for varying the direction of the line of vibratory movement of the carrier or varying the position of its path of movement, this being done in the present case by swinging the carrier or vibrator lengthwise of the platen and setting and resetting it in one or another of a plurality of normal positions to bring one ribbon field or another directly in line with the printing point so that when the vibrator is moved to cover the printing point at printing operation any desired field of the ribbon may be presented to the types. It will be understood that while the means hereinbefore described for varying the normal position of the vibrator and the location of its path of movement are especially useful when a ribbon having longitudinal fields of different characteristics is employed, nevertheless, these devices may also be made use of in connection with a ribbon of uniform character throughout. Preferably, however, when a ribbon of uniform character is to be employed it is fed both lengthwise and crosswise to more thoroughly exhaust its ink surface and in the present case I provide means for automatically varying the normal position of the vibratory carrier lengthwise of the platen, thus varying the location of the line or path of movement of the carrier so that the ribbon will be used progressively from one edge to the other as it is fed lengthwise and the type impressions will consequently follow a wavy or serpentine path such as is illustrated by the dotted line in Fig. 18 wherein a section of a ribbon of uniform character is shown and designated by the reference numeral $36^d$. In the present case the automatically operating means comprises devices which are best shown in Figs. 1, 2, 3 and 16. Referring more especially to the last named figure it will be seen that the rear end portion of the rod or shaft 96 bears in a hollow screw 108, which screw is bored out centrally to receive the rod or shaft and is threaded exteriorly to engage in a tapped opening in the bracket arm 98. Between the head of the screw and the rear face of the bracket arm a flanged washer 109 is interposed, said screw being provided with a shouldered portion $108^a$ which engages said washer and clamps it against the bracket arm. Bearing on the shouldered portion $108^a$ is a bell crank lever having a vertically disposed arm 110 and a horizontally disposed arm 111. The construction is such that the bell crank lever may turn freely on the shouldered portion $108^a$ of the screw 108 but is prevented from moving lengthwise of said screw by the head thereof at one side and by the flange washer 109 at the other side. The fingers or hooks 87 and 88 of the arm 86 are adapted to coöperate with the washer 109 between the flanges thereof. The arm 111 of the bell crank lever is provided with a hole or opening 112 which is adapted to receive the rear end portion of the pin 91 and thereby connect the bell crank lever with the segment 92 and the vibrator guide. The operation of connecting and disconnecting the bell crank lever with the vibrator guide will be explained more fully presently. The vertical arm 110 of the bell crank lever is pivotally connected at 113 with the left-hand end of a link 114, the right-hand end of said link being pivoted at 115 on a disk 116, said disk being fast to the forward end portion of a shaft 117. The shaft is horizontally disposed and has bearings in the depending arms 118 of a U-shaped bracket 119, said bracket being secured by screws 120 to the under side of the top plate. Fast on the rear of the shaft 117 is a pinion 121 which meshes with a gear wheel 122, said gear wheel receiving motion from the spring drum 16 when the latter turns to draw the carriage in printing direction. Preferably as shown in Fig. 1 the beveled pinion 45, the gear wheel 122 and the usual or a suitable ratchet wheel 123 (which engages with a pawl 123ᵃ on the spring drum) are fastened together so that they turn as one. It will be understood that when the spring drum turns to draw the carriage leftward the pawl 123ᵃ and ratchet 123 will cause the gear wheel 122 to turn with said spring drum and in the same direction, causing the pinion 121, the shaft 117 and the disk 116 to turn oppositely or in the direction of the arrow in Fig. 2. The disk 116 is in the nature of a crank and the turning thereof operates to reciprocate the link 114 back and forth longitudinally, said link in turn vibrating the bell crank lever with which it is connected. When said bell crank lever is coupled with the vibrator guide by the pin 91 engaging the bell crank lever arm 111, said guide will be automatically vibrated on its pivot 84 during letter space feeding movements of the carriage with the result that the ribbon vibrator will be moved progressively back and forth lengthwise of the platen so as to present successively different widthwise portions of the ribbon to the printing point, causing the types to follow a path such as that shown in Fig. 18.

Referring more particularly to the coupling and uncoupling operations between the vibrator guide and the actuating devices therefor these operations will be best understood from a consideration of Figs. 9 to 15 inclusive. Figs. 9, 10 and 11 are corresponding views of the parts when they are uncoupled; that is, when the pin 91 is not engaged in the opening 112 in the arm 111. In order to connect the pin 91 with the arm 111, the rod or shaft 96 is pressed longitudinally rearward, forcing the head 103 out of the grooved periphery of the segment 92 and causing the pin 91 to slide rearward through the arm 86 and its end to abut against the face of the arm 111. This position of the parts is illustrated in Fig. 14. It will be understood that at this time the conical head 103 of the pin 102, which is being forced downward by the spring 107, is tending constantly to force the segment 92 and pin 91 rearward, maintaining the end of said pin pressed against the front face of the arm 111. It will further be understood that this arm is constantly being reciprocated back and forth by reason of its connection with the spring drum 16. The result will be that when, during the reciprocatory movements of the arm 111, the opening 112 is brought opposite the pin 91, the pin will be forced rearward through said opening by the spring 107, to the position shown in Figs. 13 and 15. It will be apparent that during subsequent movements of the carriage in printing direction the back and forth movements of the bell crank arm 111 will be communicated to the arm 86, the vibrator guide and the vibrator. During these movements the rod or shaft 96 will operate as a rock shaft, turning back and forth in its bearings, and the bell crank lever will rock with said shaft 96, being held in fixed relation therewith by the pin 91. During the up and down movements of the arm 111 the forks 88 and 87 will be brought close to or against the washer 109, said forks serving as stops to positively limit the sidewise movements of the vibrator guide and the vibrator. The limits of movement are such that the vibrator will be automatically vibrated progressively between the positions shown by the full and dotted lines in Fig. 2 and which are the positions in which the vibrator is adapted to be set by hand. When it is desired to dispense with the automatic crosswise feeding of the ribbon and to again make use of the manually operated positioning devices, the finger button 100 is pulled forward to withdraw the pin 91 from the hole 112 and restore the pin 103 to its position in the grooved periphery of the segment 92 after which the parts may be set by hand as has been hitherto described.

If it is desired to dispense with the ribbon as when for example the machine is to be operated for mimeograph purposes, the shaft 75 is turned to bring the eccentric 73 to the position shown in Fig. 7. It will be apparent that when the spring 72 is under tension it is constantly tending to draw together the parts to which its ends are secured. When, therefore, the eccentric is turned as just described the spring will start to pull the arm 70 downward and also to pull downward the extension 32 and the parts connected with it including the arms 27 and the universal bar 25. The pulling down of the arm 70 by the spring 72 results in a lowering of the lever arm 62 of the vibrator. The vibrator will move downward at this time until arrested by the contact of the lower end portion of the plate 58 with the back of the arm 81. The arrest of the vibrator will, of course, arrest the lever arm 62, the link 67 and the arm 70. The position of the parts at the moment of arrest is illustrated in Fig. 7, an examination of which shows that the arrest takes place prior to the contact of the arm 70 with the eccentric 73. The pulling down of the extension 32 and arms 27 by the spring 72 results in a lowering of the universal bar 25 from the normal position represented by the dotted lines in Fig. 7 to the full line position shown in said figure. As a result of this lowering of the universal bar it will not be affected by the actuation of the printing keys, so that the types may coöperate with the platen or stencil sheet or other work sheet thereon without any movement on the part of the vibrator actuating mechanism taking place. To again render the vibrator actuating mechanism operative it is only necessary to restore the eccentric 73 to the position shown in Fig. 5 by turning the finger piece 77 forward.

It will be apparent that with a vibratory ribbon carrier constructed as herein shown and described it is possible to support said carrier on a non-shifting part of a machine which is provided with a shiftable platen, without danger of the types encroaching on one ribbon field when another ribbon field is in use, this being so because the printing portion of the ribbon extends transversely of the printing line to such an extent that it affords an ample margin of safety. It will however be understood that various principles of my invention are applicable to a ribbon carrier constructed otherwise than in the manner herein disclosed. It will further be seen that I provide a vibratory ribbon carrier supported on a lever which acts as a carrier guide and is provided with alternative means for adjustment, one of said means being controlled by hand and the other of said means being automatically controlled through a connection with the carriage spring drum; that the pin or detent 102 coöperates with the segment or member 92, when the latter is hand operated, to set said member; but by moving the rock shaft 96 longitudinally to bring the automatic controlling means into play the detent is rendered inoperative and the forks 87 and 88 alone are operative to limit the automatic movements of the carrier guide.

Various changes may be made without departing from the spirit and scope of my invention.

What I claim as new and desire to secure by Letters Patent, is:—

1. In ribbon mechanism for typewriting machines, the combination of a vibratory ribbon carrier, means for actuating said carrier at printing operation, a bifurcated ribbon guide, means for variably setting said guide, and roller bearings supported on the bifurcations of said guide and coöperating with said ribbon carrier to guide the same in the different set positions of said guide.

2. In ribbon mechanism for typewriting machines, the combination of a vibratory ribbon carrier, means for actuating said carrier at printing operation, a bifurcated ribbon guide, and grooved rollers pivoted on the bifurcations of said guide, the edges of the stem of the vibrator engaging the grooves in said rollers and said stem being arranged between said rollers.

3. In a ribbon mechanism for typewriting machines, the combination of a vibratory ribbon carrier, means for actuating the same at printing operation, a lever acting to guide said carrier, a member pivotally connected with an arm of said lever, and means for moving said member to vary the normal position of said lever and said vibrator.

4. In a ribbon mechanism for typewriting machines, the combination of a vibratory ribbon carrier, means for actuating the same at printing operation, a lever acting to guide said carrier, a member pivotally connected with an arm of said lever, a shaft on which said member is fixed, said shaft being movable either automatically or by hand to vary the normal position of said lever and said carrier.

5. In a ribbon mechanism for typewriting machines, the combination of a vibratory ribbon carrier, means for actuating the same at printing operation, a lever acting to guide said carrier, a member pivotally connected with an arm of said lever, and a detent coöperative with said member to maintain it set in one or another of a plurality of predetermined positions.

6. In a ribbon mechanism for typewriting machines, the combination of a vibratory ribbon carrier, a guide therefor, means for controlling the normal position of said guide, the controlling means comprising a member pivotally connected with said guide, a shaft with which said member is connected, said shaft being adapted to be hand controlled, and means operative at will for automatically rocking said shaft.

7. In a typewriting machine, the combination of a carriage spring drum, a vibratory ribbon carrier, a guide therefor, means for controlling the normal position of said guide, the controlling means comprising a member pivotally connected with said guide, a shaft with which said member is connected, said shaft being hand controlled, and means operative at will for automatically rocking said shaft, said means comprising connections between said shaft and said spring drum.

8. In a typewriting machine, the combination of a carriage spring drum, a vibratory ribbon carrier, a guide therefor, means for controlling said guide comprising a rock shaft and connections adapted to be rendered operative or inoperative at will between said spring drum and said rock shaft, said connections comprising a shaft geared to said spring drum, a disk on said shaft, a lever on said rock shaft, and a link connecting the last recited lever and said disk.

9. In a typewriting machine, the combination of a carriage spring drum, a vibratory ribbon carrier, a guide therefor, means for moving said guide comprising a rock shaft, and connections between said spring drum and said rock shaft, said connections being adapted to be rendered operative or inoperative at will by longitudinal movements of said rock shaft, said rock shaft when disconnected from said connections being adapted to be set by hand to vary the position of said guide.

10. In a typewriting machine, the combination of a carriage spring drum, a vibratory ribbon carrier, a guide therefor, a rock shaft, connections between said rock shaft and said guide, and connections between said spring drum and said rock shaft comprising a lever on said rock shaft, said lever having a pin and slot connection with said rock shaft which is adapted to be rendered operative or inoperative by longitudinal movements of said rock shaft.

11. In a typewriting machine, the combination of a vibratory ribbon carrier, means for actuating the same at printing operation, a bell crank lever which acts as a guide for said carrier, a rock shaft, a segment thereon having a pivotal connection with said bell crank lever, a detent coöperative with said segment, a carriage spring drum, a shaft geared to said spring drum, a disk on said shaft, a second bell crank lever, said second bell crank lever being mounted on said rock shaft, a link connecting said second bell crank lever with said disk, and a pin and slot connection between said rock shaft and said second bell crank lever, which connection may be rendered operative or inoperative at will.

12. In a typewriting machine, the combination of a vibratory ribbon carrier, a key operated universal bar, a rock shaft connected with and supporting said universal bar, and connections between said rock shaft, and said vibratory ribbon carrier, said connections comprising an eccentric device supported on said rock shaft.

13. In a typewriting machine, the combination of a vibratory ribbon carrier, a key operated universal bar, a rock shaft connected with and supporting said universal bar, and connections between said rock shaft and said vibratory ribbon carrier, said connections comprising an operating lever fulcrumed on a fixed part and pivotally connected with said carrier, an arm pivotally connected with said rock shaft, a link connecting said operating lever and said arm, an eccentric device, and a spring tending constantly to maintain said arm in coöperation with said eccentric device.

14. In a typewriting machine, the combination of printing key levers, a vibratory ribbon carrier, an operating lever therefor, an actuating link, a rock shaft operated by said printing keys, and devices connecting said actuating link with said rock shaft said devices comprising an arm pivotally connected with said rock shaft, an eccentric device coöperative with said arm and a spring tending to force said eccentric device and said arm into engagement.

15. In a typewriting machine, the combination of a vibratory ribbon carrier, a key operated universal bar, a rock shaft connected with and supporting said universal bar, and connections between said rock shaft and said vibratory ribbon carrier, said connections comprising a hand controlled eccentric device supported on said rock shaft, an arm pivotally connected with said rock shaft, and a spring tending to maintain said arm in coöperation with said eccentric device.

16. In a typewriting machine, the combination of printing key levers, a universal bar normally operative thereby, a rock shaft connected with and supporting said universal bar, a vibratory ribbon carrier, and connections between said carrier and said rock shaft comprising an eccentric device, said eccentric device being adapted to be set to render said key levers inoperative on said universal bar.

17. In a typewriting machine, the combination of a vibratory ribbon carrier, a rock shaft, a plate-like member thereon, an arm pivoted to said member and connected with said carrier, a hand controlled eccentric device journaled on said member, a spring tending to maintain said arm in co-active engagement with said eccentric device, and a key controlled universal bar pivotally connected with said rock shaft.

18. In a typewriting machine, the combination of a vibratory ribbon carrier, a rock shaft, a plate-like member fixed to said rock shaft, an arm pivoted on said member and connected with said carrier, a hand controlled eccentric device journaled on said member, an extension on said member, a spring tending to maintain said arm in co-active engagement with said eccentric device, a key controlled universal bar pivotally connected with said rock shaft, and connections between said extension and the letter feeding devices of the machine, said extension being adjustably connected with said member.

19. In a typewriting machine, the combination of a vibratory ribbon carrier, a rock shaft, connections between said carrier and said rock shaft, a key controlled universal bar, connections between said universal bar and said rock shaft, an arm or extension adjustably supported on said rock shaft, and connections between said arm or extension and the letter feeding devices of the machine.

20. In a typewriting machine, the combination of a vibratory ribbon carrier, a rock shaft, connections between said carrier and said rock shaft, a key controlled universal bar, connections between said universal bar and said rock shaft, an arm or extension adjustably supported on said rock shaft, and connections between said arm or extension and the letter feeding devices of the machine comprising a member having a pin and slot connection with said arm or extension.

21. In a typewriting machine, the combination of a vibratory ribbon carrier, a rock shaft, connections between said carrier and said rock shaft, a key controlled universal bar, connections between said universal bar and said rock shaft, an arm or extension adjustably supported on said rock shaft, and connections between said arm or extension and the letter feeding devices of the machine comprising a member having a pin and slot connection with said arm or extension, said last recited member also having a pin and slot connection with the spacing levers of the machine.

22. In a typewriting machine, the combination of a vibratory ribbon carrier, a rock shaft, connections between said rock shaft and said carrier, an extension on said rock shaft, a universal bar connected with said rock shaft, printing key levers operative on said universal bar, spacing levers inoperative on said universal bar, a cross rod connected with said spacing levers, letter feeding devices, and connections between said letter feeding devices and both said extension and said spacing levers, said connections comprising a member having an arm which has a pin and slot connection with said extension and is provided with a slot coöperating with said cross rod.

23. In a typewriting machine, the combination of a ribbon carrier, a rock shaft, connections between said shaft and carrier, an extension on said shaft, a universal bar connected with said shaft, printing key levers operative on said universal bar, spacing levers inoperative on said universal bar and carrying a cross rod, letter feeding devices, and connections between said letter feeding devices and both said extension and said spacing levers, said connections comprising parallel arms carrying a pin coöperative with a slot in said extension, said parallel arms being provided with slots coöperative with said cross rod.

24. In a typewriter, the combination with a ribbon, a frisket adapted to hold the operative field of said ribbon, a guide frame permitting vertical movement of said frisket into and out of operative position, and means for moving said frisket vertically into and out of operative position; of automatic means for moving said guide frame back and forth laterally during the operation of the typewriter.

25. In a typewriter, the combination with a ribbon, a frisket adapted to hold the operative field of said ribbon and permitting the feeding of the ribbon vertically through the operative field, and a guide frame permitting vertical movement of said frisket into and out of operative position; of means for moving said frisket vertically into and out of operative position, and automatic means for moving said ribbon back and forth laterally in horizontal direction in the operative field during its feeding in vertical direction.

26. In a ribbon mechanism, the combination of a ribbon guiding mechanism having a frisket moving in a vertical plane guiding the operative field of the ribbon longitudinally vertically and adapted to have a limited lateral movement in the same plane, corresponding to the width of the ribbon, automatic means controlled by the operation of the printing keys for causing said lateral frisket movement during the printing operation, and hand operated means for setting said frisket into and releasing same from the key controlled position.

Signed at the borough of Manhattan, city of New York, in the county of New York and State of New York, this 24th day of December A. D. 1907.

CLIO B. YAW.

Witnesses:
M. F. HANNWEBER,
J. B. DEEVES.